US008360536B2

(12) United States Patent
Garg

(10) Patent No.: US 8,360,536 B2
(45) Date of Patent: Jan. 29, 2013

(54) ENTERTAINMENT UNIT WITH INPUT CONNECTIONS AND SLIDING SHELVES

(75) Inventor: Praggya Garg, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 767 days.

(21) Appl. No.: 12/205,865

(22) Filed: Sep. 6, 2008

(65) Prior Publication Data

US 2010/0060117 A1 Mar. 11, 2010

(51) Int. Cl.
*A47B 81/00* (2006.01)
(52) U.S. Cl. .................. 312/223.6; 312/7.2; 108/50.02; 439/207; 439/502
(58) Field of Classification Search .................. 312/7.2, 312/351, 223.3, 223.6, 257.1; 52/27; 174/68.3; 108/50.01, 50.02; 439/623, 502, 207
See application file for complete search history.

(56) References Cited

U.S. PATENT DOCUMENTS

| 853,750 | A | * | 5/1907 | Whorrall | 138/120 |
| 5,340,326 | A | * | 8/1994 | LeMaster | 439/207 |
| 5,516,298 | A | * | 5/1996 | Smith | 439/131 |
| 5,655,822 | A | * | 8/1997 | Roberts et al. | 312/194 |
| 5,792,992 | A | * | 8/1998 | Handler | 174/101 |
| 5,829,130 | A | * | 11/1998 | Miller | 29/868 |
| 5,971,799 | A | * | 10/1999 | Swade | 439/502 |
| 6,095,623 | A | * | 8/2000 | Goto et al. | 312/7.2 |
| 6,503,104 | B1 | * | 1/2003 | Yuga et al. | 439/623 |
| 6,585,195 | B2 | * | 7/2003 | Wentworth et al. | 248/49 |
| 6,814,009 | B2 | * | 11/2004 | Acevedo et al. | 108/50.02 |
| 6,948,241 | B2 | * | 9/2005 | Tadokoro | 29/872 |
| 6,960,098 | B1 | * | 11/2005 | Tseng | 439/502 |
| 2003/0102781 | A1 | * | 6/2003 | White et al. | 312/7.2 |
| 2004/0018778 | A1 | * | 1/2004 | Easterbrook et al. | 439/701 |

FOREIGN PATENT DOCUMENTS

| GB | 2417107 A | 2/2006 |
| JP | 2001268478 A | 9/2000 |
| JP | 2004328643 A | 11/2004 |
| WO | 2006079958 A1 | 8/2006 |

OTHER PUBLICATIONS

Fernandez, et al.; Multi-Port I/O Connector Cable; http://www.ip.com/pubview/IPCOM000065008D.

* cited by examiner

*Primary Examiner* — James O Hansen
(74) *Attorney, Agent, or Firm* — Sony Corporation of America

(57) ABSTRACT

An apparatus comprising a connection hub having an input terminal for receiving a plurality of inputs from a plurality of component devices, and an output terminal for transferring a plurality of outputs from said connection hub to a display device. The apparatus further comprises a plurality of audio/video cables and a cable conduit coupled to the output terminal of the connection hub, wherein the audio/video cables traverse the cable conduit such that the visibility of the audio/video cables is obscured by the cable conduit.

20 Claims, 14 Drawing Sheets

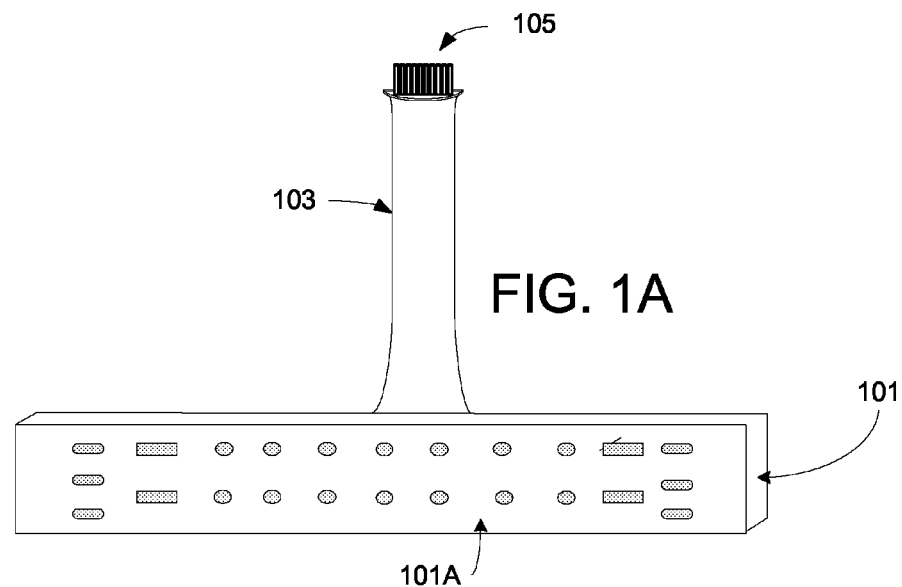
FIG. 1A
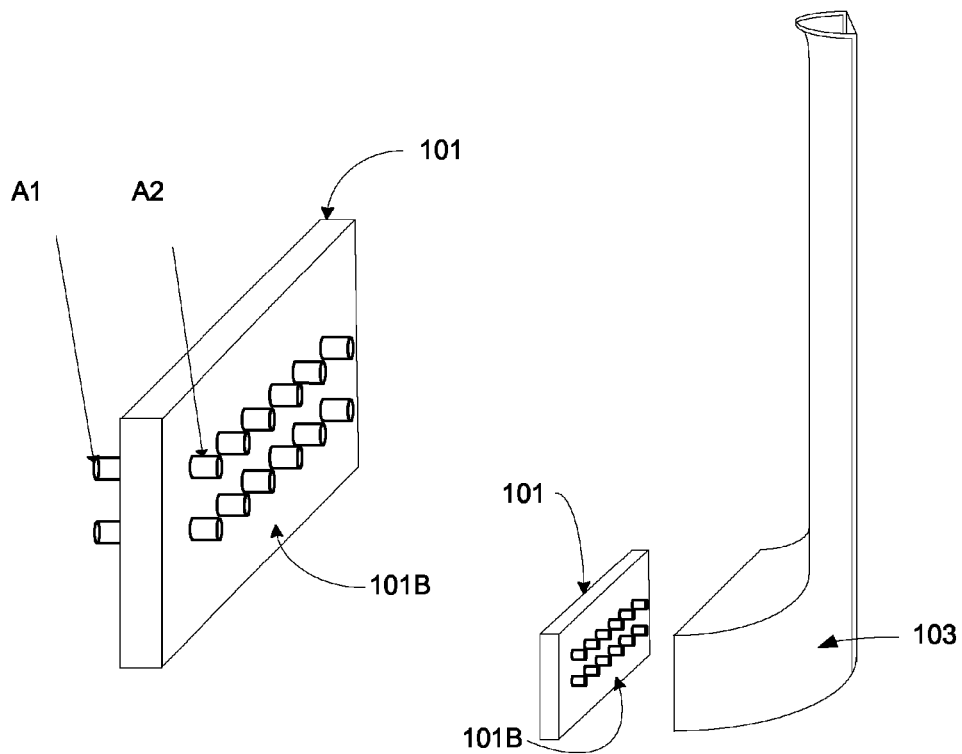
FIG. 1B
FIG. 1C

ENTERTAINMENT UNIT WITH INPUT CONNECTIONS AND SLIDING SHELVES

FIELD OF THE INVENTION

The present application relates to entertainment units and cabling for audio/video resources. More particularly, the present application relates to entertainment units wherein the cabling used to connect component devices to a display device is obscured.

BACKGROUND OF THE INVENTION

The usage and popularity of flat panel displays, e.g., Liquid Crystal Display ("LCD") and Plasma televisions and monitors, have experienced a dramatic increase within both residences and businesses in recent years. Flat panel displays offer substantial benefits over non flat-panel (e.g., Cathode Ray Tube, rear-projection, and Digital Light Projection) display devices of equivalent viewing dimensions. These benefits include typically substantial reductions in weight (thereby increasing versatility and portability) and volume (reducing occupation of living space). Other benefits may include an increase in perceived aesthetic value.

One popular configuration of flat panel televisions and larger monitors is known as "wall mounting." Wall mounting a television generally involves affixing the television to a portion of a flat surface of a wall, and typically does not include additional structural support (e.g., from a television stand, pillar, or the like). A common wall mounting technique includes attaching a wall mount apparatus to a desired height of the wall, and subsequently hanging the television (usually by way of one or more hooks or latches) to the wall-mounted apparatus.

For a television to display input from peripheral component devices (e.g., a cable or satellite box, video game consoles, computer system, DVD player, etc.) the television must receive as input the data streamed from the peripheral component devices. Most commonly, this data is transmitted through cables of varying sizes and thicknesses that correspond to various audio/video standards.

However, as each component device typically requires one or more cables, a wall mounted television coupled to a multitude of devices may be encumbered with several cables of incongruous length and diameter. Typically, these component devices are not wall mounted but rather, positioned in, or supported by structures such as entertainment units (e.g., television stands, entertainment cabinets), which are in turn situated on or near the ground. As a result, the cables connecting a wall mounted television to component devices often hang or droop a considerable distance, and are clearly visible along the space between the wall mounted television and the entertainment unit and/or corresponding component devices.

These hanging cables are often considered aesthetically unpleasant and generally sought to be avoided. Furthermore, as cables of excessive length may collect in a "pool" near the ground, this cluster of cables may present a safety hazard, and may become inconveniently entangled. In addition, some televisions may not have input terminals in a localized space, but rather, on opposite or relatively perpendicular positions along the frame or back surface of the television. For larger televisions, the displacement of the input terminals may lead to a greater likelihood of tangled cables and increasing the aesthetic deficiency.

One solution that has been used for this problem is to drill two or more apertures in the wall with the mounted television, whereby the cables are threaded through the apertures so that substantial lengths of the cables are positioned behind the wall. Unfortunately, this solution typically results in noticeable, permanent damage to the affixing wall, may adversely affect other wiring or plumbing, and may require professional assistance and/or tools. Also, depending on the wall's framing, a clear path behind the sheet rock may not even exist.

Also, conventional entertainment units which are implemented as a cabinet-type enclosures commonly have a relatively small hole centrally positioned in an otherwise unbroken back surface. This hole is used to allow cables to connect the television or display device to component devices contained in the cabinet by threading the cable through the hole (and back surface of the cabinet). However, the hole may be too small in diameter to easily allow the threading of several cables.

In addition, entertainment cabinets with multiple tiers may have component devices distributed amongst the tiers. As the hole is centrally positioned within the back surface, the angle of the cables as the cable is threaded through the hole may be different for each cable to reach devices on disparate levels and positions. As devices are added and removed, the cables are layered and may become so intertwined within the cabinet that unplugging one cable may unintentionally unplug one or more other cables.

Further exacerbating the problem is the typically limited space provided within the entertainment unit. As the output terminal of a component device is typically located along the back surface of the device, plugging a component device often requires plugging in cables to the component device outside the confines of the entertainment unit prior to placing the component device within the entertainment unit. This requires a lengthier cable than is necessary, which subsequently increases the likelihood of pooling and tangling.

SUMMARY OF THE INVENTION

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Embodiments of the present invention are directed to devices and systems directed at an entertainment unit wherein a plurality of component devices is coupled to a wall-mounted display device such that cables are collected and localized with a reduced or obscured visibility. Specifically, an apparatus and system for coupling output from a plurality of component devices are enclosed by a cover which extends from a connection hub to the display device. The system includes a connection hub, a cabinet or enclosure, and a display device.

In one embodiment, an apparatus is provided for collecting and localizing a plurality of cables with a reduced or obscured visibility. The plurality of cables is coupled to a hub of input and a display device which receives as input output from the hub.

In another embodiment, a system includes a display device, an entertainment unit (or like supporting structure) and an apparatus for collecting and localizing a plurality of cables with a reduced or obscured visibility, wherein the hub of the apparatus is disposed in the entertainment unit.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 1A depicts a graphical representation of an anterior view of an exemplary apparatus in accordance with one embodiment of the present invention.

FIG. 1B depicts a graphical representation of a side view of an exemplary connection hub in accordance with one embodiment of the present invention.

FIG. 1C depicts a graphical representation of a side view of an exemplary connection hub and an exemplary cable conduit in accordance with one embodiment of the present invention.

DETAILED DESCRIPTION

Figure 2:
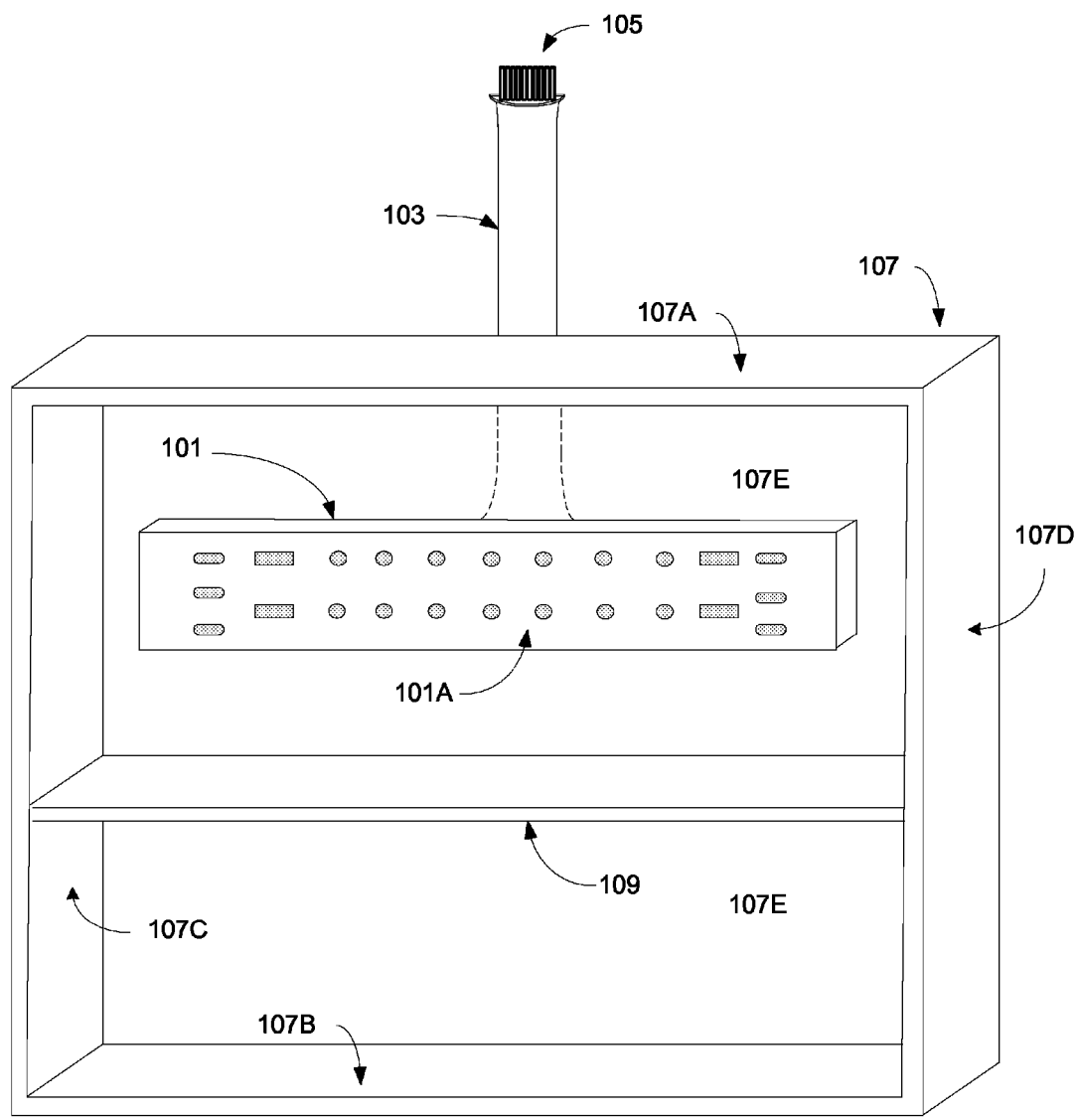
FIG. 2 depicts a graphical representation of an anterior view of an exemplary entertainment unit in accordance with one embodiment of the present invention.

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, and components, have not been described in detail as not to unnecessarily obscure aspects and features of the subject matter.

In the following embodiments, an approach is described for a apparatus and system of providing a connection hub and cable conduit from a plurality of component devices to a wall-mounted display device. Embodiments include an entertainment unit for supporting a plurality of component. Embodiments also propose a system of an entertainment unit and a display device wherein a distance between the two is traversed by a single cable conduit.

Exemplary Connection Apparatus

With reference now to FIG. 1A, an illustration of an exemplary connection apparatus for providing a hub and conduit for audio/video connection cables is depicted, in accordance with one embodiment. In a typical configuration, exemplary connection apparatus includes connection hub 101, cable conduit 103, and a plurality of output cables 105.

As depicted in FIG. 1A, connection hub 101 includes an input terminal 101A, for receiving input (via cables) from component devices. In one embodiment, input terminal 101A comprises a plurality of ports capable of receiving input from cables of various audio/video standards. Each standard may have a separate and distinct hardware e.g., connector structure. Accordingly, each port of input terminal 101A may be specific to one standard. An audio/video cable of a device of a particular standard may thus plug in to input terminal 101A via a corresponding port. Supported standards may include, but are not limited to, standards such as Composite Video; Component Video; Stereo Audio, High Definition Multimedia Interface (HDMI); Super or Separated Video (S Video); Computer video, e.g., Video Graphics Array (VGA) and Digital Video Interface (DVI); Ethernet (e.g., Category 5 Cable); Universal Serial Bus; and Digital Living Network Alliance (DLNA).

Some standards are commonly transmitted in more than one integrated cable. For example, component video cables are often correlated with stereo audio. Accordingly, a corresponding port for such a configuration may consist of two or more connector jacks. In one embodiment, where applicable, the connectors or jacks comprising each input port of input terminal 101A conform to a female configuration (e.g., designed to receive a male-configured plug).

In one embodiment, input terminal 101A may not include a port for every enumerated standard. In a further embodiment, input terminal 101A may have a plurality of ports for one or more standards, in disparate amounts. For example, input terminal 101A may have five HDMI inputs ports for instance, but only one each of a USB, DVI and CAT5 port.

Connection hub 101 also includes output terminal 101B (depicted in FIG. 1B). Output terminal 101B comprises a plurality of output ports corresponding to the input ports of input terminal 101A. Each output port of output terminal 101B matches an input port of input terminal 101A. Connection hub 101 emits as output in a corresponding output port in output terminal 101B the input received in an input port in input terminal 101A. For example, a VGA input port on input terminal 101A would have a corresponding VGA output port on output terminal 101B. Thus, when a component device (such as a DVD player) is plugged into an appropriate input port of input terminal 101A, and a display device (a television, for example), is plugged into the output port of output terminal 101B which corresponds to the input port the DVD player is plugged into, the multimedia signal is transmitted from the DVD player to the television as though directly connected via audio/video cables.

In one embodiment, where applicable, the connectors or jacks comprising each output hub of output terminal 101B conform to a male configuration, e.g., designed to plug into a female-configured connector (jack).

According to FIG. 1A, connection hub 101 is coupled to a cable conduit 103. Cable conduit 103 may be configured to extend in a direction of a display device. For example, cable conduit 103 may extend vertically towards a display device positioned above the connection hub. A plurality of output cables 105 corresponding to one or more audio/video standards couples to corresponding output ports of output terminal 101B.

In one embodiment, each of the plurality of output cables 105 has an end with a female-configured connector and an end with a male-configured connector. In a further embodiment, the female-configured connector end of each of the plurality of output cables 105 couples with a port on output terminal 101B having a male connector configuration corresponding to the same audio/video standard. One or more male-configured connector ends may also be coupled to a jack or other female configured connector of a video and/or audio display device. The plurality of output cables 105 may be threaded through cable conduit 103. In one embodiment, threading the plurality of output cables 105 through cable conduit 103 inhibits the visibility of the portion of the plurality of output cables 105 enclosed in the cable conduit 103.

With reference to FIG. 1B, an illustration of a connection hub from a side view perspective is depicted, in accordance with one embodiment. FIG. 1B depicts the connection hub 101 of FIG. 1A. As presented in FIG. 1B, connection hub 101 includes output terminal 101B. Output terminal 101B comprises a plurality of output ports which correspond to the input ports of input terminal 101A. For example, as shown in FIG. 1B, output port A2 corresponds to input port A1. Thus, a device receiving input (e.g., via audio/video cable) from output port A2 will receive as input the input received in connection hub 101 from input port A1. In one embodiment, output port A2 is positioned in direct alignment with input port A1. In other embodiments, output port A2 may be positioned so as to not directly align with input port A1.

Referring now to FIG. 1C, an illustration of a side view of an exemplary connection hub and an exemplary cable conduit is depicted, in accordance with one embodiment. Cable conduit 103 is configured so as to attach to connection hub 101. In one embodiment, an end portion of cable conduit 103 is constructed in a spade or funnel-like shape to roughly correspond to the dimensions of connection hub 101, and enclosing output ports of output terminal 101B. Cable conduit 103 may attach to connection hub 101 by any suitable mechanism, for example, a latch, hook, screw, or like method.

Exemplary Entertainment Unit

With reference now to FIG. 2, an illustration of an anterior view of an exemplary entertainment unit is depicted, in accordance with one embodiment. In a typical configuration, exemplary entertainment unit includes a cabinet 107 and a connection hub 101, cable conduit 103, and plurality of output cables 105, as described above.

In one embodiment, cabinet 107 may be implemented as an enclosing structure having a plurality of intersecting surfaces. Cabinet 107 may be utilized, for example, to store or support component electronic devices. As depicted in FIG. 2, cabinet 107 includes two horizontal surfaces (top surface 107A and bottom surface 107B), and three vertical surfaces (side surfaces 107C, 107D and back surface 107E). In alternate embodiments, a front surface (opposite back surface 107E) may also be included in cabinet 107. In further embodiments, a front surface may be implemented as one or more surfaces of glass or like transparent material, operating as a door or flap. The surfaces of cabinet 107 may be comprised of, for example, wood, metal or any material used in the construction of furniture. In one embodiment, connection hub 101 is positioned against the back surface 107E of cabinet 107.

In further embodiments, cabinet 107 may comprise two or more tiers, with each tier delineated by an additional horizontal surface, such as a shelf 109. Shelf 109 may be utilized to store or support additional component electronic devices. In one embodiment, shelf 109 may be equipped with a sliding mechanism, such that shelf 109 may be able to extend away from back surface 107E of cabinet 107. In further embodiments, shelf 109 may have an adjustable height. In still further embodiments, connection hub 101 may be supported by shelf 109, and capable of altering its position in accordance with the extension of shelf 109.

A cable conduit, such as cable pipe 103, couples to connection hub 101. As depicted in FIG. 2, cable pipe 103 couples to connection hub 101 along a back surface of connection hub 101. In some embodiments, back surface 107E may be of an opaque material. Accordingly, a portion of cable pipe 103 may not be visible from an anterior position. The dotted lines represent this portion, and the relative position of cable pipe 103.

Plurality of output cables 105 are threaded through cable pipe 103 and couple to the output terminal of connection hub 101. Each of the plurality of output cables 105 may, for example, be an audio/video cable corresponding to an audio/video standard. Audio/video cables may be used to connect the input terminal of connection hub 101 with corresponding audio/video devices. In one embodiment, the audio/video devices are positioned within cabinet 107. Due to the proximity of a audio/video device in cabinet 107 to the connection hub 101, audio/video cables of a relatively short length may be used. As the cost of a cable is typically directly proportional to its length, by using shorter audio/video cables, the cost of connecting audio/video devices to a display or output device may be reduced.

Figure 3:
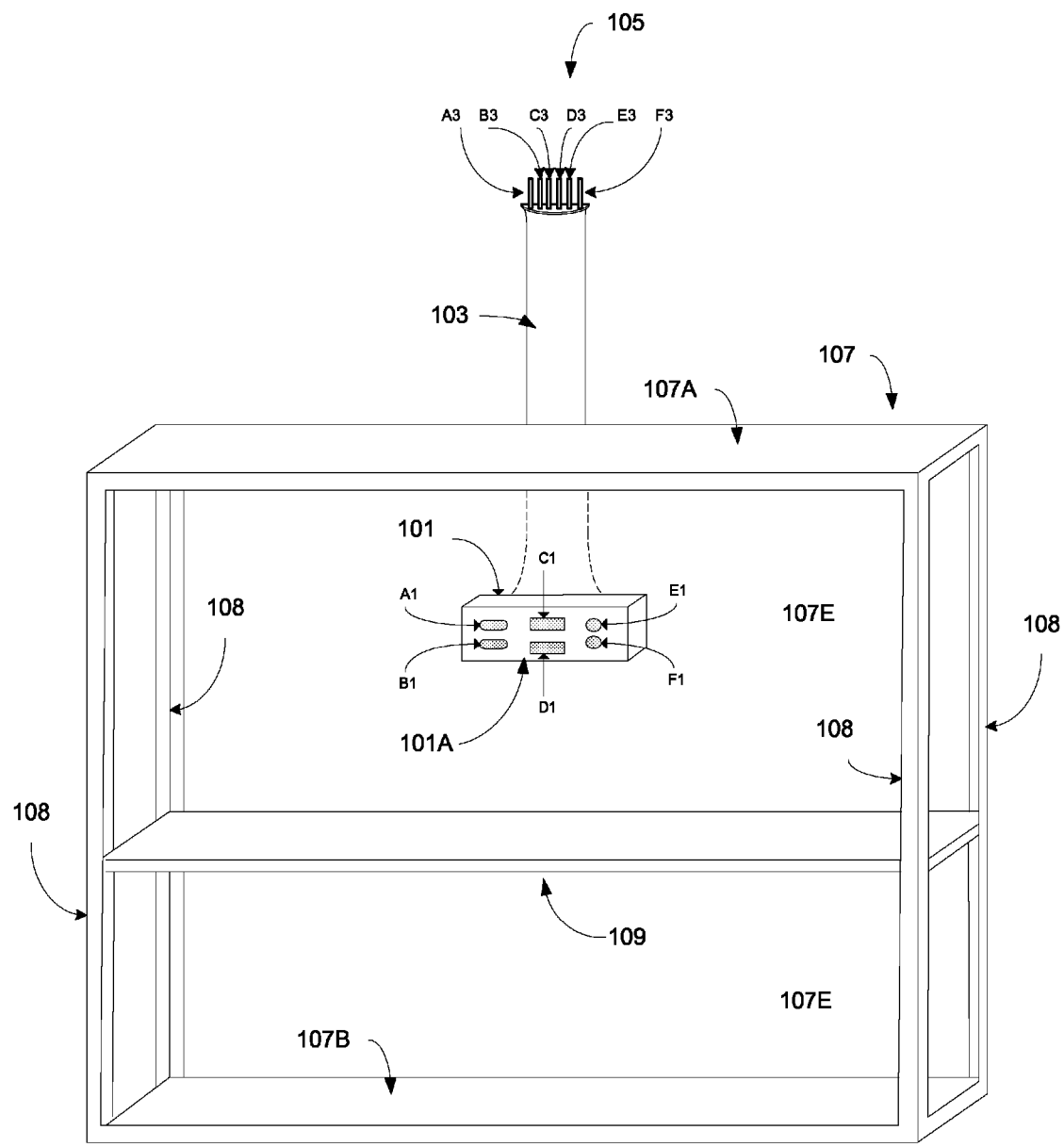
FIG. 3 depicts a graphical representation of an anterior view of an exemplary entertainment unit in accordance with an alternate embodiment of the present invention.

With reference now to FIG. 3, an illustration of an anterior view of an exemplary entertainment unit is depicted, in accordance with an alternate embodiment. The exemplary entertainment unit of FIG. 3 also includes a cabinet 107 with shelf 109, a connection hub 101, cable conduit 103, and plurality of output cables 105, as described above.

As presented in FIG. 3, cabinet 107 may not include the side surfaces 107C, 107D of FIG. 2. Instead, the cabinet 107 of FIG. 3 includes an alternative supporting design. In one embodiment, the alternative supporting design may include supporting structures such as pillars arranged in various configurations (e.g., corner pillars 108). As depicted in FIG. 3, corner pillars 108 may be coupled to, and support, horizontal surfaces 107A and 107B. In one embodiment, back surface 107E is affixed to the corner pillars 108 disposed towards the rear of the cabinet 107.

The size and number of ports (both input and output) of a connection hub 101 as displayed in any embodiment is for exemplary purposes only and may vary according to various embodiments. As shown, the connection hub 101 of FIG. 3 consists of only a few input ports (and, a corresponding number of output ports) relative to the connection hub 101 of FIG. 2. Input terminal 101A provides six input ports A1, B1, C1, D1, E1 and F1 and an equivalent number of output ports (not shown). The output ports are coupled to appropriate audio/video cables (e.g., audio/video cables A3, B3, C3, D3, E3 and F3) out of the plurality of output cables 105. Thus, output cable A3 is coupled to the output port corresponding to input port A1, output cable B3 is coupled to the output port corresponding to input port B1, and output cables C3, D3, E3 and F3 are coupled to the output ports corresponding to input ports C1, D1, E1 and F1, respectively. The plurality of output cables 103 is connected to the input connectors of a display device (e.g., television), which may receive as input from the plurality of cables the input received in input terminal 101A of connection hub 101.

Figure 4:
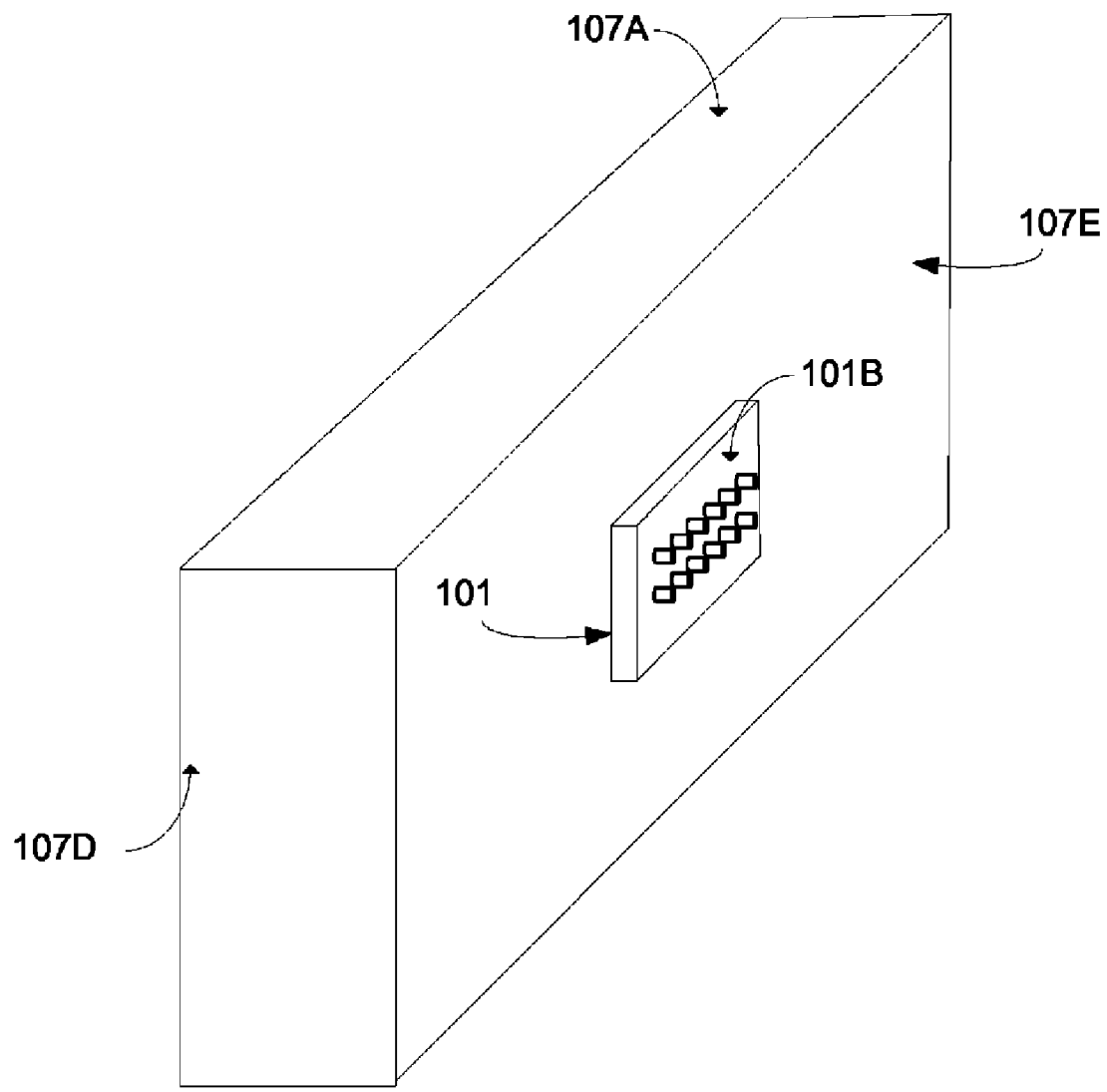
FIG. 4 depicts a graphical representation of a side view of an exemplary entertainment unit in accordance with one embodiment of the present invention.

With reference now to FIG. 4, an illustration of a side view of an exemplary entertainment unit is depicted, in accordance with an alternate embodiment. The exemplary entertainment unit of FIG. 4 includes a cabinet 107 and a connection hub 101, as described above. Cabinet 107 also includes a top surface 107A, side surface 107D and back surface 107E, as described above. The connection hub includes an output terminal 101B, having a plurality of output ports which correspond to connectors of one or more audio/video standards.

In one embodiment, back surface 107E of cabinet 107 includes an aperture through which a rear surface (e.g., output terminal 101B) of connection hub 101 may protrude. In a further embodiment, back surface 107E may include attachment mechanisms which allow a cable pipe (not shown) to attach to the back surface 107E and/or output terminal 101B. In alternate embodiments, the aperture allows an appropriately sized portion of a cable pipe to extend through, so as to couple with a connection hub 101 disposed within the cabinet 107.

Figure 5:
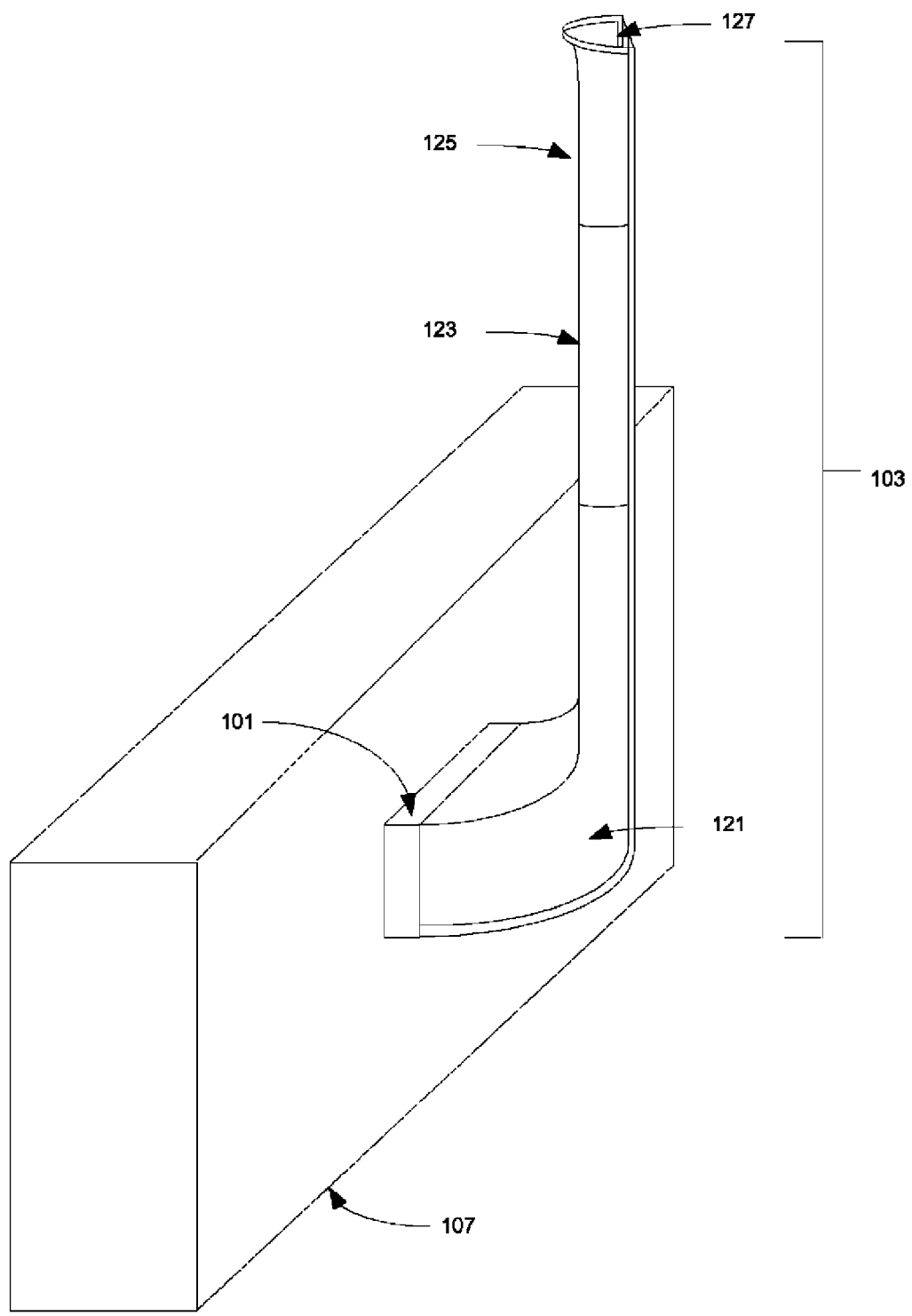
FIG. 5 depicts a graphical representation of a side view of an exemplary entertainment unit with a cable conduit in a fully extended configuration in accordance with one embodiment of the present invention.

With reference now to FIG. 5, an illustration of a side view of an exemplary entertainment unit with a cable conduit in a fully extended configuration is depicted, in accordance with an alternate embodiment. The exemplary entertainment unit of FIG. 5 includes a cabinet 107 with a connection hub 101 coupled to a cable conduit 103, as described above.

In one embodiment, cable conduit 103 is a hollow cylinder (e.g., pipe or tube) through which a plurality of cables may traverse, so that the portions of the cables traversing cable conduit 103 is not visible from outside the cable conduit 103. In further embodiments, cable conduit 103 comprises a half-cylinder, wherein a flat surface is positioned against a wall. In some embodiments, cable conduit 103 may be segmented in to two or more parts. As shown in FIG. 5, cable conduit 103 includes a bottom cover portion 121, a middle cover segment 123, and upper cover segment 125. Bottom cover portion 121 of cable conduit 103 is configured to couple to a back surface of cabinet 107 and/or a rear surface of connection hub 101.

In some embodiments, bottom cover portion 121 of cable conduit 103 is constructed in a spade or funnel-like shape to roughly correspond to the dimensions of connection hub 101. Cable conduit 103 may be attached to connection hub 101 by, for example, a latch, hook, screw, or like method. Middle cover segment 123 extends from bottom cover portion 121. Upper cover segment 125 extends from middle cover segment 123 and/or bottom cover portion 121.

In one embodiment, upper cover segment 125 may include an opening portion 127, an opening of cable conduit 103 that allows a threading of the plurality of output cables traversing cable conduit 103. In some embodiments, the circumference of opening portion 127 may be wider (e.g., like a funnel) than the circumference of the cross-section of the remaining half-cylinder portion of top cover segment 125. The wider circumference of opening portion 127 is to facilitate the threading of one or more cables through cable conduit 103.

Figure 6:
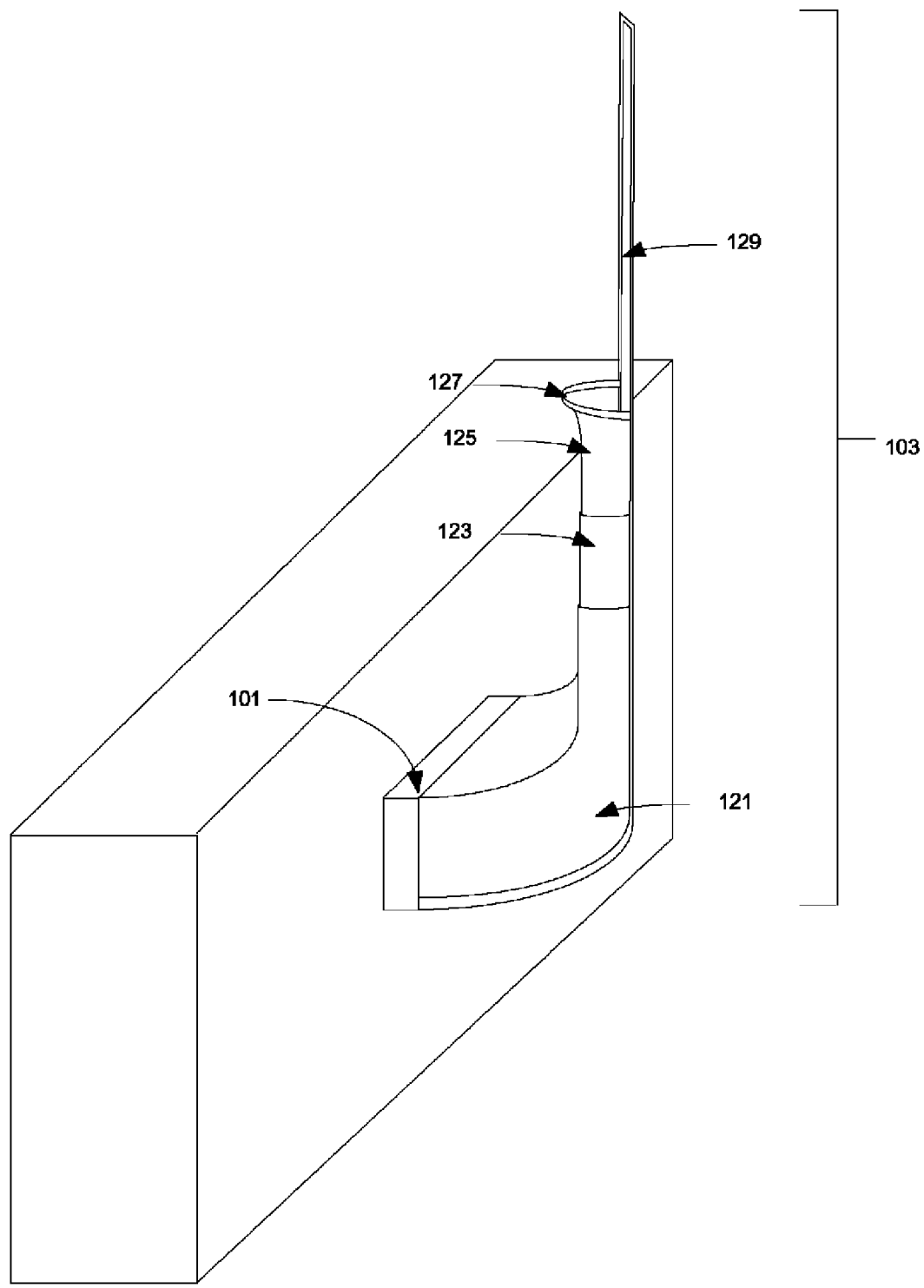
FIG. 6 depicts a graphical representation of a side view of an exemplary entertainment unit with a cable conduit in an uncovered configuration in accordance with one embodiment of the present invention.

With reference now to FIG. 6, an illustration of a side view of an exemplary entertainment unit with a cable conduit in an uncovered configuration is depicted, in accordance with an alternate embodiment. The exemplary entertainment unit of FIG. 6 includes a cabinet 107 with a connection hub 101 coupled to a cable conduit 103, as described above.

In one embodiment, cable conduit 103 may comprise a back portion 129, attached to bottom cover portion 121, middle cover segment 123 and top cover segment 125. In further embodiments, bottom cover portion 121, middle cover segment 123 and top cover segment 125 comprise a front cover portion of adjustable length. Bottom cover portion 121, middle cover segment 123 and top cover segment 125 may, for example, be configured so as to be telescoping. For example, bottom cover portion 121, middle cover segment 123 and top cover segment 125 may configured so as to be concentric, wherein top cover segment 125 may be fully enclosed by middle cover segment 123, which in turn may be fully enclosed by bottom cover portion 121.

In further embodiments, the entire length of cable conduit 103 may be adjustable, such that both the back portion 129 and the portions comprising the front cover portion are telescoping. Telescoping to a desired height may be accomplished, for example, by implementing a series of notches or short platforms along back portion 129 and one or more hooks in each portion of adjustable position (e.g., middle cover segment 123 and top cover segment 125) such that the hook of a segment may latch on to, and be supported by a notch. A cable conduit 103 with an adjustable height allows the cable conduit 103 to be adjusted to comply with a range of distances between the entertainment unit and a wall-mounted display device.

In alternate embodiments, cable conduit 103 may be implemented as a series of removable interconnecting segments. Accordingly, the length of cable conduit 103 may be adjustable by removing one or more segments from the sequence of interconnecting segments. As depicted in FIG. 6, middle cover segment 123 and top cover segment 125 are not fully extended, thus exposing a length of back portion 129. By adjusting the height of the covered portion of back portion 129, threading a cable through cable conduit 103 is accomplished with greater ease.

Figure 7:
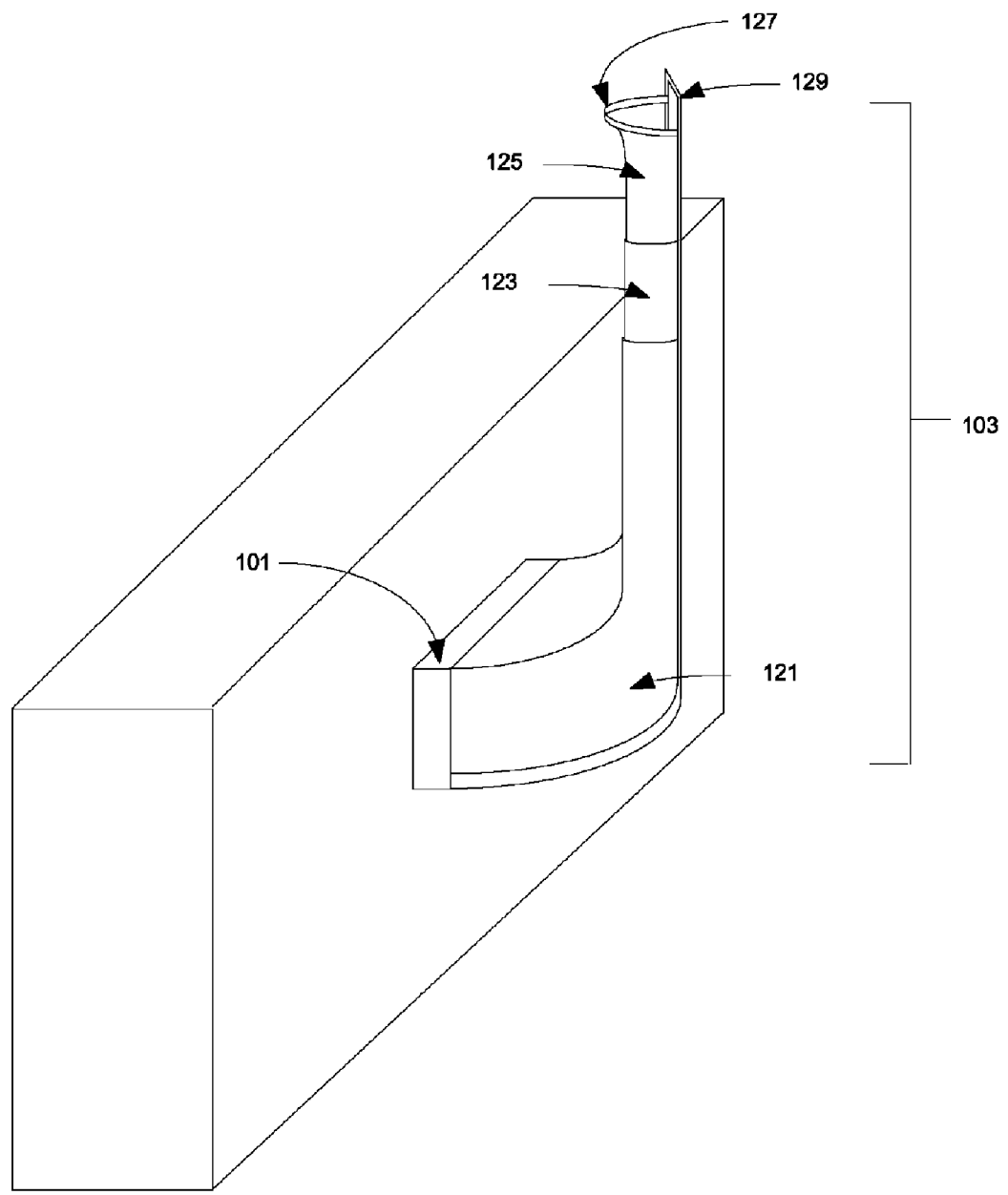
FIG. 7 depicts a graphical representation of a side view of an exemplary entertainment unit with a cable conduit in a partially extended configuration in accordance with one embodiment of the present invention.

With reference to FIG. 7, an illustration of an exemplary entertainment unit with a cable conduit in a partially extended configuration is depicted, in accordance with an alternate embodiment. FIG. 7 depicts a cable conduit 103 wherein both the front cover portion (e.g., bottom cover portion 121, middle cover segment 123, and top cover segment 125) and the back portion 129 of cable conduit 103 are not partially extended.

Exemplary Cable Conduit

Figure 8:
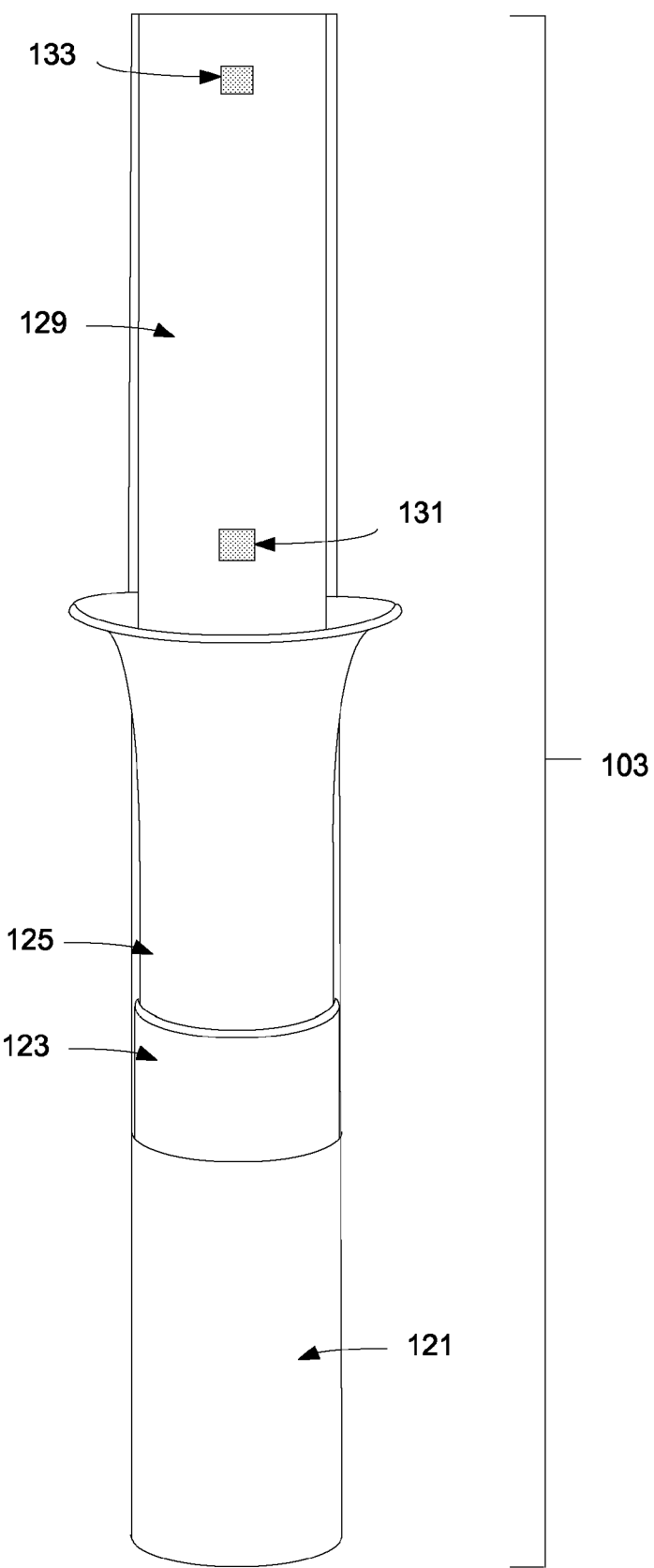
FIG. 8 depicts a graphical representation of an exemplary cable conduit in a partially extended configuration in accordance with one embodiment of the present invention.

With reference to FIG. 8, an illustration of an exemplary cable conduit in a partially extended configuration is depicted, in accordance with one embodiment. In a typical configuration, cable conduit 103 includes bottom cover portion 121, middle cover portion 123, top cover segment 125, as previously described.

In one embodiment, cable conduit 103 includes mechanisms for attachment (e.g., screw 131, 133) to allow attachment of cable conduit 103 to a surface, such as a wall. In one embodiment, back portion 129 of cable conduit 103 is attached to a surface. In some embodiments, mechanisms for attachment may comprise screws which are screwed into an adjacent wall. In other embodiments, mechanisms for attachment may comprise other conventional methods for attaching rigid materials (e.g., fabric hook and loop fasteners or adhesive straps). In one embodiment, mechanisms for attachment may be distributed along the length of cable conduit 103 at certain intervals.

Figure 9:
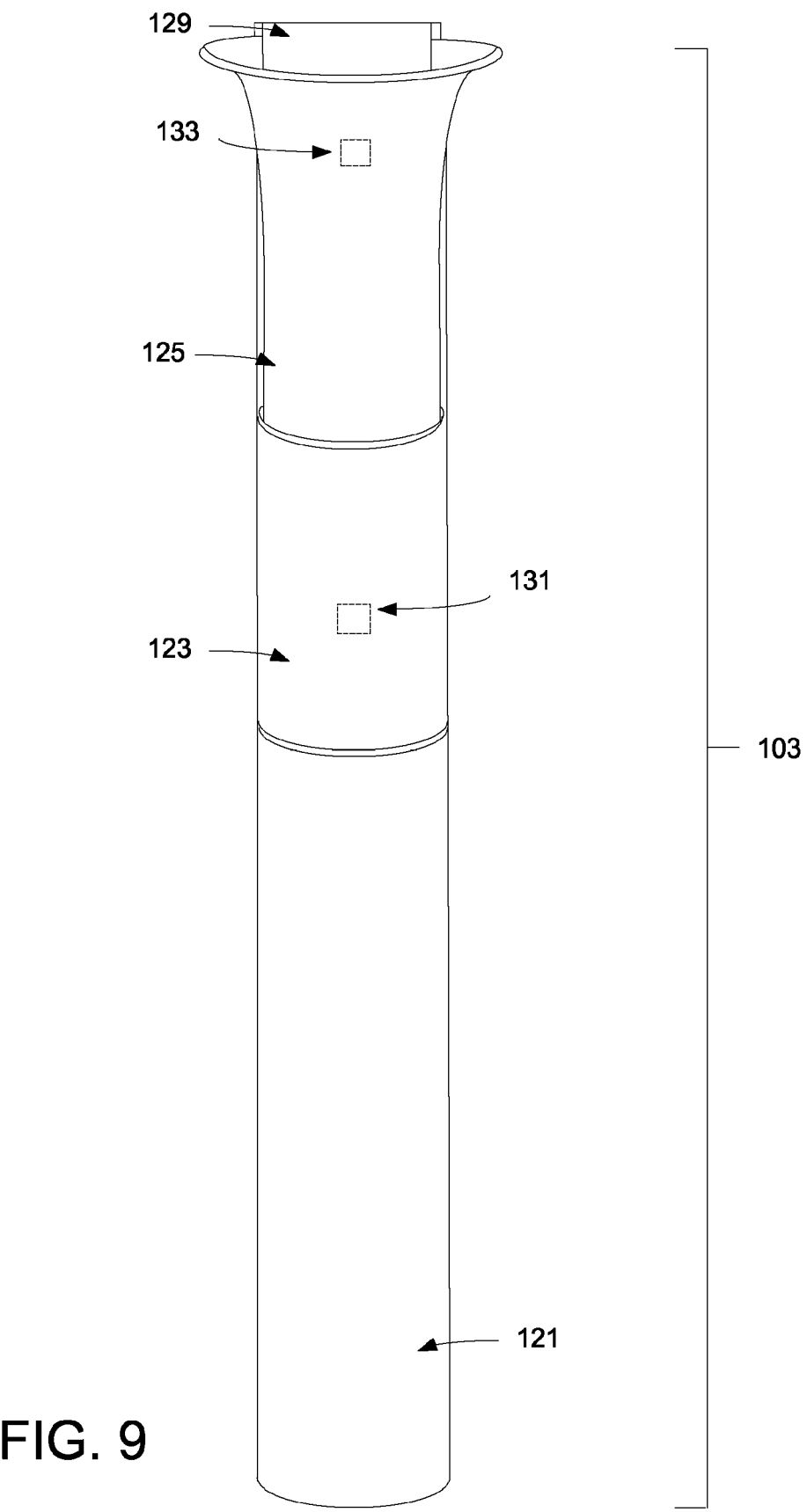
FIG. 9 depicts a graphical representation of an exemplary cable conduit in a fully extended configuration in accordance with one embodiment of the present invention.

With reference to FIG. 9, an illustration of an exemplary cable conduit in a fully extended configuration is depicted, in accordance with one embodiment. FIG. 9 depicts the cable conduit 103 of FIG. 8, wherein middle cover segment 123 and top cover segment 125 are extended so that the maximum (or near maximum) of coverage is attained. In embodiments that feature mechanisms for attachment which are attached to only back portion 129 of cable conduit 103, full extension of the middle cover segment 123 and top cover segment 125 may obscure the visibility of the mechanisms for attachment. The positions of the mechanisms for attachment are indicated by dotted lines.

Figure 10:
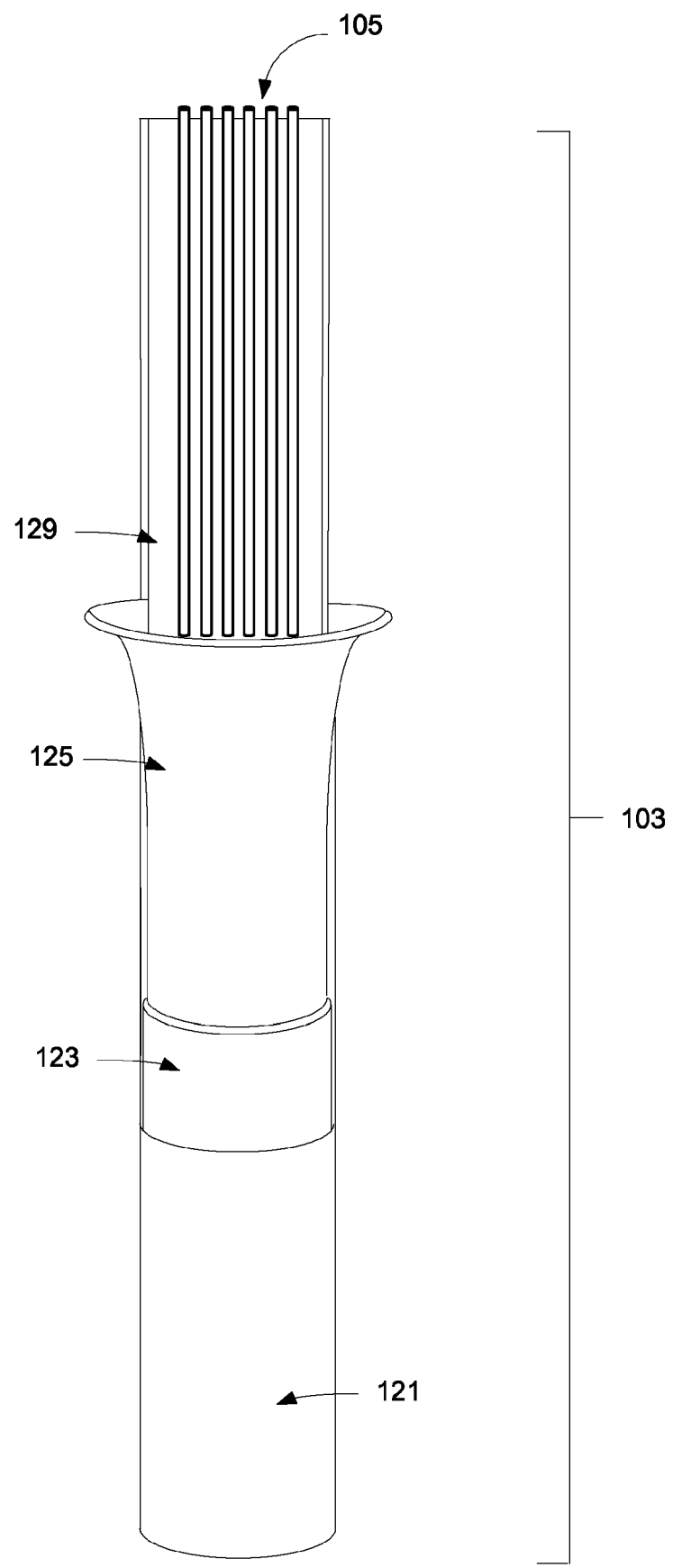
FIG. 10 depicts a graphical representation of an exemplary cable conduit with traversing cables in a partially extended configuration in accordance with one embodiment of the present invention.

With reference now to FIG. 10, an illustration of the exemplary cable conduit of FIG. 8 with traversing cables in a partially extended configuration is depicted, in accordance with one embodiment of the present invention. FIG. 10 depicts a configuration of a cable conduit with an adjustable cover length, wherein the middle cover segment 123 and top cover segment 125 are not fully extended. As depicted, a plurality of output cables 105 are threaded through cable conduit 103. The portions of the plurality of output cables 105 underneath the area covered middle cover segment 123 and top cover segment 125 are obscured from view.

Figure 11:
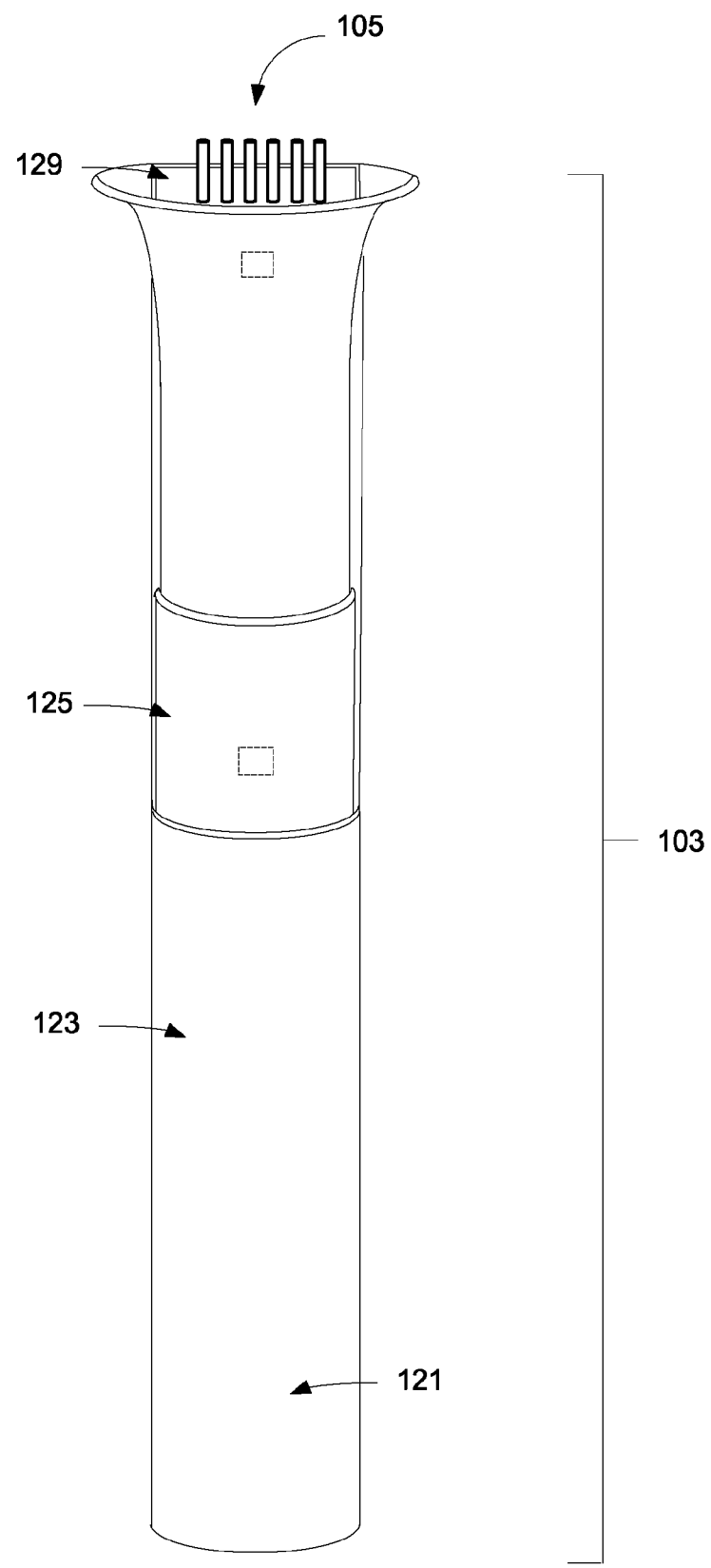
FIG. 11 depicts a graphical representation of an exemplary cable conduit with traversing cables in a fully extended configuration in accordance with one embodiment of the present invention.

With reference now to FIG. 11, an illustration of the exemplary cable conduit of FIG. 8 with traversing cables in a partially extended configuration is depicted, in accordance with one embodiment of the present invention. FIG. 11 depicts a configuration of a cable conduit with an adjustable cover length, wherein the middle cover segment 123 and top cover segment 125 are extended. As depicted, a plurality of output cables 105 are threaded through cable conduit 103. The portions of the plurality of output cables 105 underneath the area covered middle cover segment 123 and top cover segment 125 are obscured from view.

Exemplary System

Figure 12:
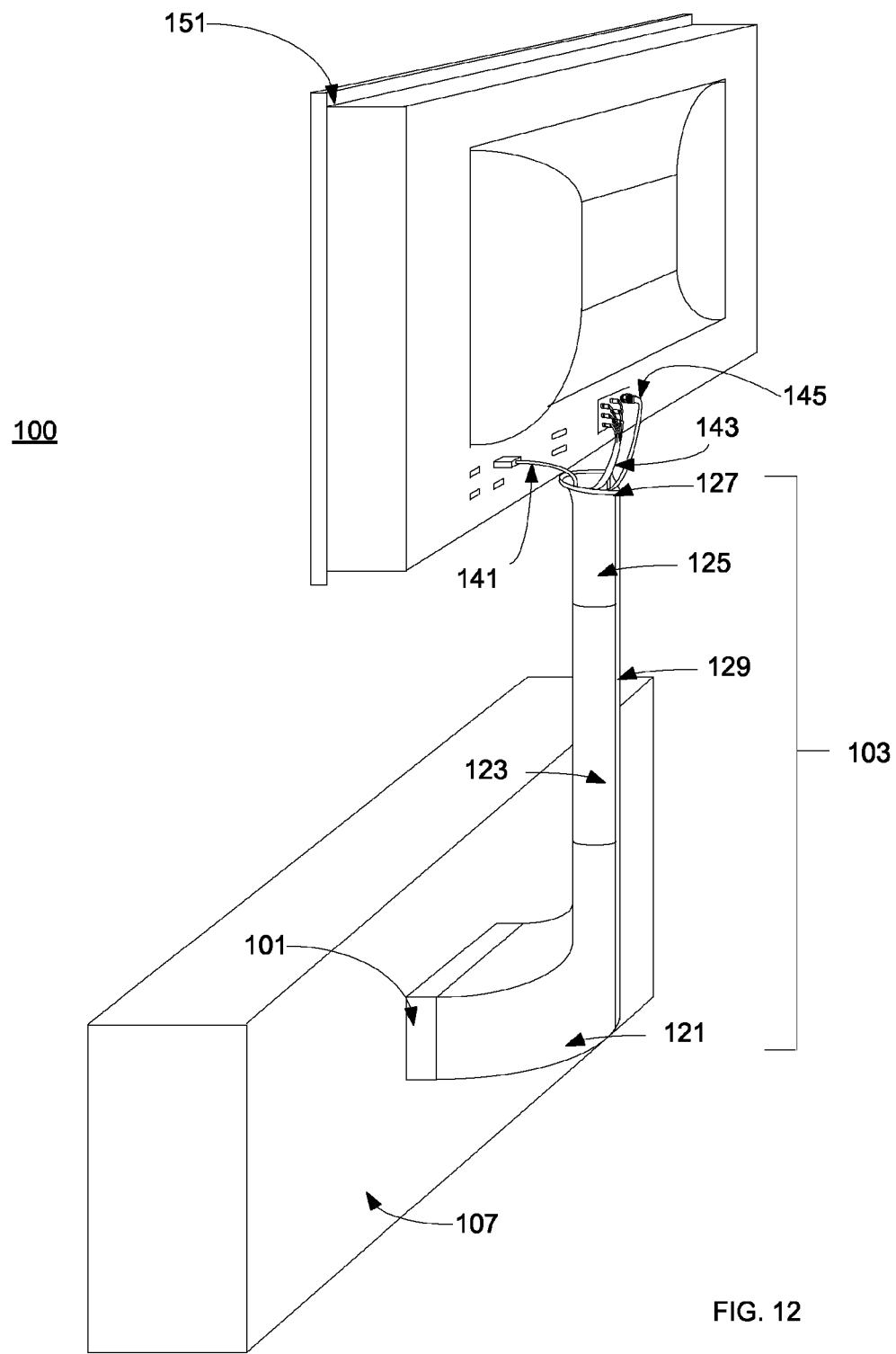
FIG. 12 depicts a graphical representation of a side view of an exemplary system in accordance with one embodiment of the present invention

With reference to FIG. 12, an illustration of an exemplary system 100 is depicted, in accordance with one embodiment. In a typical configuration, exemplary system 100 includes a connection hub 101, cable conduit 103, cabinet 107 and display device 151. In one embodiment, cable conduit 103 includes a bottom cover portion 121, a middle cover segment 123 and a top cover segment 125 (with opening portion 127), as described previously.

As depicted in FIG. 12, a plurality of input ports of display device 151 are coupled to a plurality audio/video cables (e.g., composite cable 145, component cables 143 and HDMI cable 141) of various audio/video standards. The plurality of audio/video cables traverse cable conduit 103, and couple to an output terminal of connection hub 101. In one embodiment, a plurality of component devices is disposed in cabinet 107. Each of the plurality of component devices is coupled to an input terminal of connection hub 101 via one or more input cables. The input received by the input terminal of connection hub 101 from the plurality of component devices are the transmitted via the plurality of audio/video cables traversing cable conduit 103 (e.g., composite cable 145, component cables 143 and HDMI cable 141), so that output from the plurality of component devices is received as input into the display device. In other embodiments, the number of audio/video cables may vary, according to various configurations.

In one embodiment, display device 151 is a wall-mounted television. In other embodiments, display device 151 may be a monitor, a projection screen, or any such medium for the display of video input.

Figure 13:
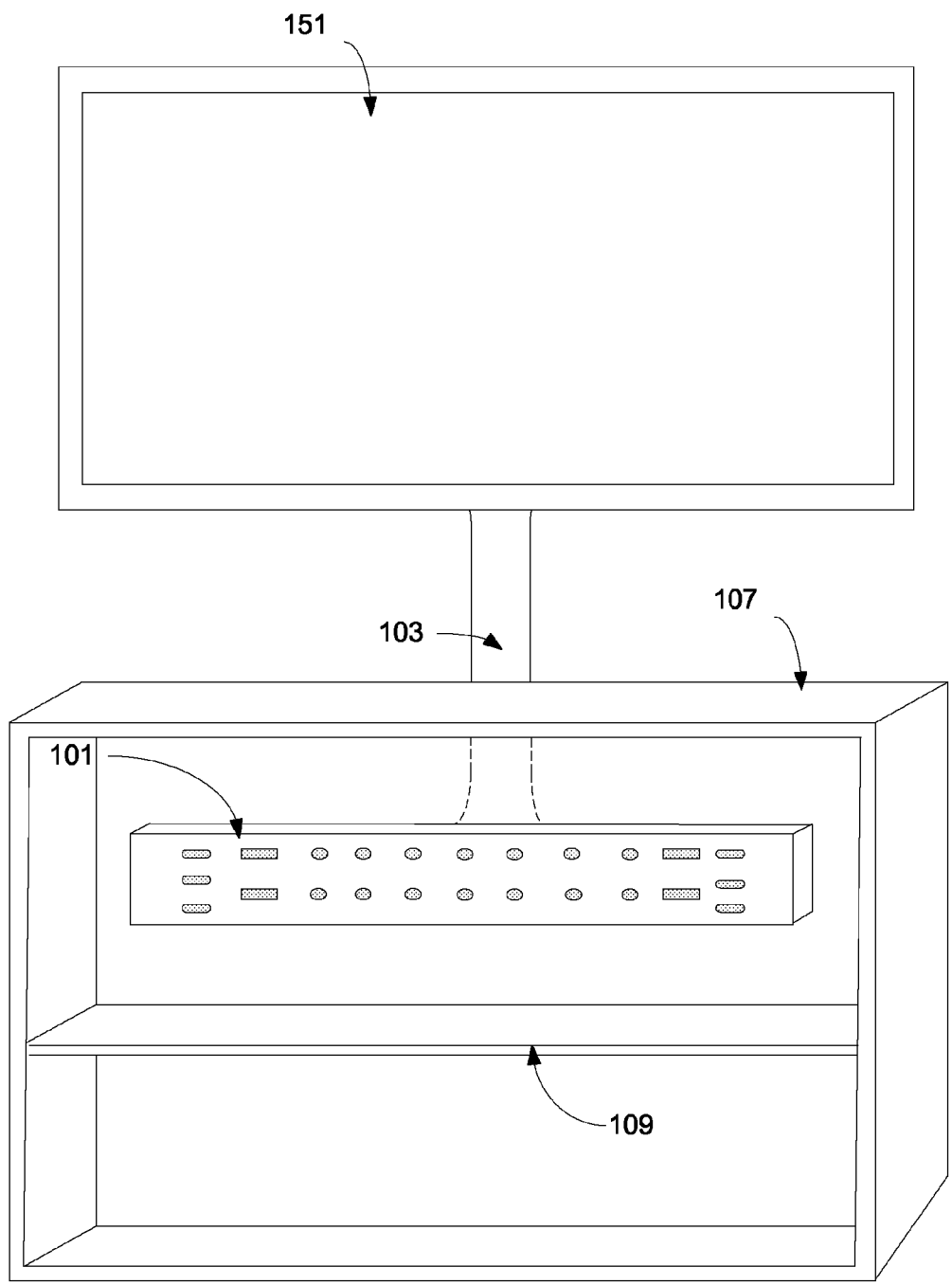
FIG. 13 depicts a graphical representation of an anterior view of an exemplary system in accordance with one embodiment of the present invention.

With reference to FIG. 13, an illustration of an anterior view of exemplary system 200 is depicted, in accordance with one embodiment. In a typical configuration, exemplary system 200 includes a connection hub 101, cable conduit 103, cabinet 107 and display device 151.

As depicted in FIG. 13, cabinet 107 may also include a shelf 109, wherein component devices may be supported. In one embodiment, connection hub 101 may be disposed on shelf 109. In further embodiments, shelf 109 includes a mechanism for sliding, wherein the position of shelf 109 may be modified so as to "slide" (extend) away from the back surface of the cabinet 107. As presented, the visibility of any cables coupling connection hub 101 to display device 151 which traverse cable conduit 103 may be completely obscured.

Figure 14:
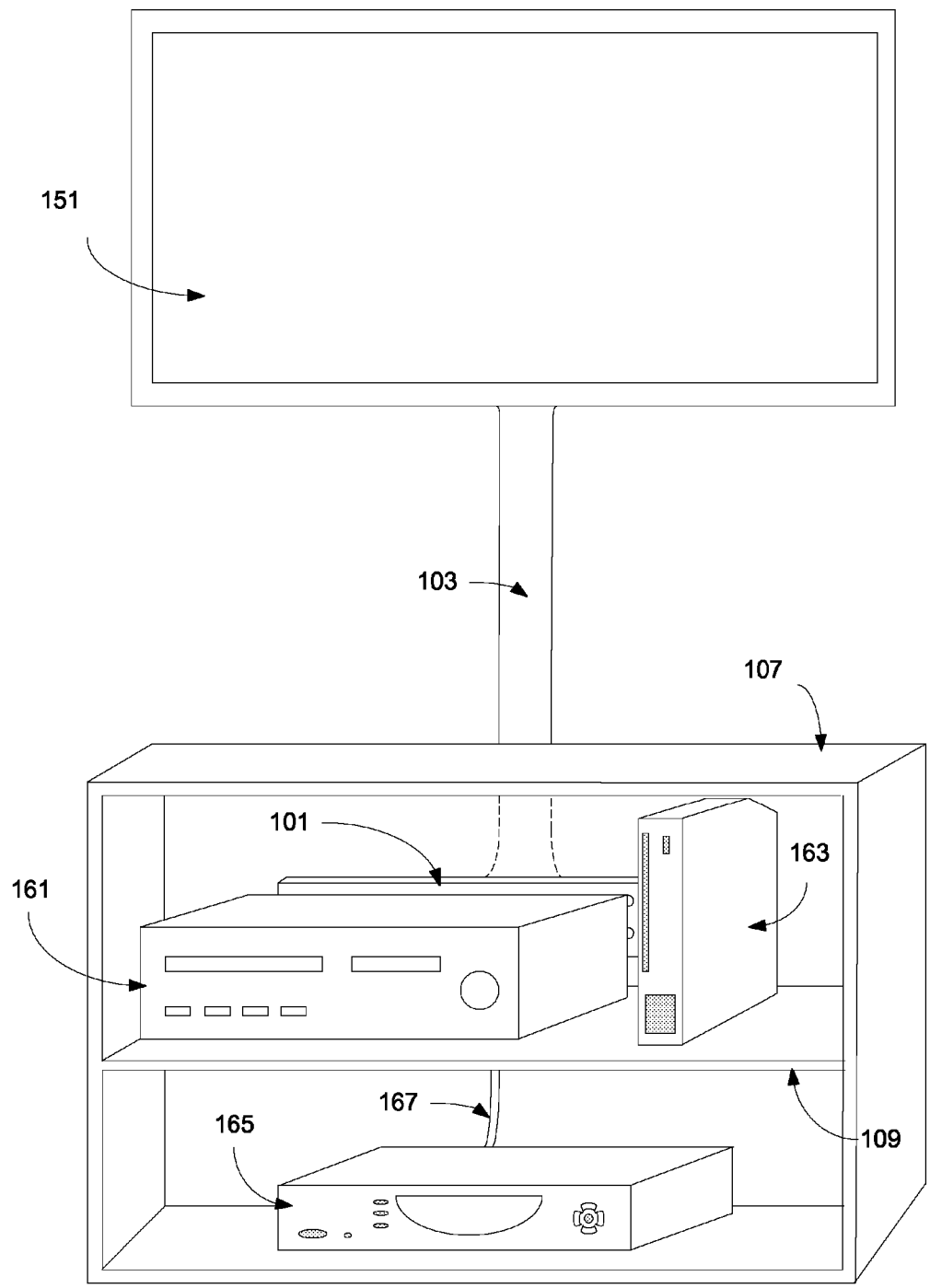
FIG. 14 depicts a graphical representation of an anterior view of an alternate exemplary system in accordance with one embodiment of the present invention.

With reference to FIG. 14, an illustration of an exemplary system 300 is depicted, in accordance with one embodiment. In a typical configuration, exemplary system 300 includes a connection hub 101, cable conduit 103, cabinet 107 and display device 151, as previously described. In one embodiment, exemplary system 300 also includes a plurality of component devices, e.g., DVD player 161, video game console 163 and cable box 165.

As depicted in FIG. 14, cabinet 107 may also include a shelf 109, wherein component devices (e.g., DVD player 161 and video game console 163) may be supported. In further embodiments, shelf 109 includes a mechanism for sliding, wherein the position of shelf 109 may be modified so as to "slide" (extend) away from the back surface of the cabinet 107.

As presented, cable box 167 is coupled to connection hub 101 via composite input cable 167. Likewise, DVD player 161 and video game console 163 are also coupled to connection hub 101 via audio/video input cables (not shown). The output of the component devices is transmitted through the input cables and is output through connection hub 101 to display device 151 via corresponding output cables. The output cables may be threaded through cable conduit 103, so as to traverse the distance between display device 151 and connection hub 101 whilst enclosed in cable conduit 103. The visibility of any output cables coupling connection hub 101 to display device 151 which traverse cable conduit 103 may be completely obscured.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus, comprising:
   a connection hub comprising:
   an input terminal operable to receive a plurality of inputs from a plurality of component devices;
   an output terminal operable to transfer a plurality of outputs from said connection hub to a display device;
   a cable conduit, for coupling with said output terminal of said connection hub;
   and
   a plurality of audio/video cables coupled to said output terminal of said connection hub and traversing said cable conduit, wherein a visibility of said plurality of audio/video cables is substantially obscured by said cable conduit,
   wherein said cable conduit comprises a back portion and a front cover portion, said front cover portion comprising a plurality of collapsible, telescoping sections and being configured to adjust a length of said front cover portion via adjustment of said plurality of collapsible, telescoping sections.

2. The apparatus of claim 1, wherein said input terminal of said connection hub couples with a plurality of component devices via a plurality of audio/video cables.

3. The apparatus of claim 1, wherein a length of said cable conduit is adjustable.

4. The apparatus of claim 1, wherein a length of said back portion is adjustable; and
wherein said front cover portion is configured to attach to said back portion, said front cover portion covering a length of said back portion equal to a length of said front cover portion when said front cover portion is attached to said back portion.

5. The apparatus of claim 4, wherein said front cover portion of said cable conduit is concentrically telescoping.

6. The apparatus of claim 4, wherein said back portion of said cable conduit is for affixture with a structural surface.

7. The apparatus of claim 6, wherein said structural surface is a wall of a building.

8. The apparatus of claim 7, wherein said back portion of said cable conduit is telescoping.

9. The apparatus of claim 1, wherein audio/video cables of said plurality of audio/video cables couple with a plurality of inputs of a display device.

10. The apparatus of claim 1, wherein said display device is a wall-mounted flat panel television.

11. An entertainment unit, comprising:
a cabinet, comprising a plurality of surfaces, said plurality of surfaces comprising a back surface;
a connection hub disposed in said cabinet, said connection hub comprising:
a first terminal for receiving an input from a component device; and
a second terminal for transmitting an output from a component device as input into a display device; and
a cable pipe coupled to said back surface of said cabinet and directly traversing an area between said connection hub and said display device, said cable pipe comprising a back portion and a front cover portion, said front cover portion comprising a plurality of telescopically collapsible sections;
wherein said transmitting said output from said terminal into a display device is performed via a plurality of audio/video cables communicatively coupling said second terminal to said display device
further wherein said cable pipe is operable to substantially obscure a visibility of said plurality of audio/video cables in an area between said connection hub and said display device via adjustment of said plurality of telescopically collapsible sections.

12. The entertainment unit of claim 11, wherein said cabinet further comprises a shelf surface disposed in said cabinet.

13. The entertainment unit of claim 11, wherein said cabinet comprises a surface within a space enclosed by said cabinet, said surface for resting a component device thereon.

14. The entertainment unit of claim 11, wherein a component device is for coupling to said connection hub via a first audio/video cable, said connection hub for coupling to a display device via a second audio/video cable, and wherein said second audio/video cable is disposed in, and traverses, said cable pipe.

15. The entertainment unit of claim 14, wherein said second audio/video cable has a length greater than a length of said first audio/video cable.

16. A system comprising:
a display device;
a plurality of component devices;
an entertainment unit;
a connection hub disposed in said entertainment unit;
a cable pipe comprising a back portion and a front cover portion, said front cover portion comprising a plurality of telescopically collapsible sections, said cable pipe being operable to couple with said connection hub and directly traversing the area between said connection hub and said display device, said cable pipe traversing a distance between said entertainment unit and said display device; and
a plurality of audio/video cables for transferring output from a component device of said plurality of component devices to said display device, said plurality of audio/video cables coupled to said connection hub and said display device, and traversing said cable pipe wherein said plurality of audio/video cables is visually obscured by said cable pipe in an area between said connection hub and said display device via adjustment of said plurality of telescopically collapsible sections.

17. The system of claim 16, wherein said connection hub comprises:
a terminal for receiving an input from a component device; and
a terminal for transmitting an output from a component device as input into said display device.

18. The system of claim 17, wherein said cable pipe has an adjustable length.

19. The system of claim 17, wherein said entertainment unit comprises a plurality of surfaces, said plurality of surfaces comprising a back surface.

20. The system of claim 19, wherein said cable pipe couples with said connection hub through said back surface of said entertainment unit.

* * * * *